United States Patent [19]

Stern et al.

[11] Patent Number: 4,925,308

[45] Date of Patent: May 15, 1990

[54] CALIBRATION OF THREE-DIMENSIONAL SPACE

[75] Inventors: Howard K. Stern, Greenlawn; William Yonescu, Dix Hills; Daniel A. Briceno, Northport, all of N.Y.

[73] Assignee: Robotic Vision System, Inc., Hauppauge, N.Y.

[21] Appl. No.: 230,443

[22] Filed: Aug. 9, 1988

[51] Int. Cl.$^5$ .............................................. G01B 11/00
[52] U.S. Cl. .................................... 356/375; 356/243; 356/376
[58] Field of Search ...................... 356/375, 376, 243; 250/560, 561

[56] References Cited

U.S. PATENT DOCUMENTS

| | | | |
|---|---|---|---|
| 4,188,544 | 2/1980 | Chasson | 356/376 |
| 4,375,921 | 3/1983 | Morander | 356/243 |
| 4,682,894 | 7/1987 | Schmidt et al. | 356/243 |
| 4,801,207 | 1/1989 | Williams | 356/243 |

Primary Examiner—F. L. Evans
Attorney, Agent, or Firm—Max Fogiel

[57] ABSTRACT

A method and apparatus is provided for calibrating distance measuring instruments, in particular, optical three dimensional measurement sensors. The method is not restricted to aligning the motion of the calibrating surface to be parallel to the sensor centerline. Accordingly more than one sensor can be present during the calibration procedure. This leads to the practicality of aligning multiple sensor systems using a common translation stage for all sensors or using translation stages that are a part of the system. The joint calibration of sensors embedded in a system guarantees proper registration without additional steps. A method for calibrating optical sensors to accuracies approaching the wavelength of light is given.

12 Claims, 4 Drawing Sheets

CALIBRATION OF THREE-DIMENSIONAL SPACE

BACKGROUND OF THE INVENTION

Optical triangulation systems are coming into greater use for machine vision for automated inspection, material handling, assembly, and a variety of manufacturing tasks. The precision of these measurement systems relies on the accuracy of calibration and the ability of the system to retain the calibrated accuracy. It has thus become important to devise methods for rapid and accurate calibration of three-dimensional sensors. See for example, U.S. Pat. No. 4,682,894.

The manufacture of precision calibration equipment is potentially expensive because of the difficulty in obtaining the necessary accuracy. The cost can best be reduced by using the simplest shapes, minimum number of parts, and using inherently accurate machining procedures.

The accuracy of calibration of optical sensors is affected by dependencies on calibration techniques which rely on results obtained from calibrating sensor depth. Plate flatness measured to $+/-0.0001''$ and precise translation mechanisms permit relatively easy calibration of optical sensors with accuracies up to $+/-0.001''$.

Surface reflectivity variations caused by surface attitude as well as reflection coefficients and specularity adversely affect calibration accuracy. Flat, matte surfaces reduce inaccuracy best from these causes.

In the prior art it was shown that by taking a flat plate perpendicular to the centerline of an optical measurement sensor, and by accurately translating along that centerline and recording measurements made at specific intervals, one would be able to calibrate the sensor very accurately. This procedure, however, has turned out to be very restrictive in some applications.

It was also shown in the prior art that measurements lateral to the centerline of the sensor could be made by sloping the plate at a known angle to the centerline of the sensor, and translating the sloped plate either along the centerline or orthogonal to it.

SUMMARY OF THE INVENTION

It is the object of the present invention to overcome the prior art disadvantages. In particular, it is the object of the present invention to improve accuracy, reduce cost of implementation, and simplify usage by translating the flat plate in a direction not along the centerline of the sensor and using data averaging.

When it is a requirement of the calibration method that calibration motion be performed along the centerline of the sensor, it is then only practical to use the motion to calibrate a sensor mounted at a single location. However, by calibrating the sensor with its centerline at an angle to the direction of motion, more than one sensor can be calibrated and they will be automatically registered to one another. Ordinarily registration is an additional step which is now conveniently eliminated.

The sensors need not be aligned at an angle to the direction of motion to register two sensor if the measurement fields overlap. For example, two sensors with their centerlines parallel to the direction of motion and overlapping measurement fields can be calibrated, and hence registered to one another, using a single calibration plate. Additional directions can be calibrated as desired.

In keeping with these objects, and with still others which will become apparent as the description proceeds, the important characteristics of the invention are: ease of manufacture, verifiable accuracy, greater resolution, rapid sensor calibration and multiple sensor calibration capability at the site of use with automatic registration.

In an embodiment of the present invention, a very flat plate is manufactured and the surface is either coated or modified to obtain a diffuse reflective characteristic. This plate is mounted on a precision translation mechanism and aligned to be perpendicular to the direction of motion. The vision sensor is set up such that the plate, at its center of travel, lies at the center of the sensor field of vision. The measurement made by the sensor at that location becomes zero along the axis. Measurements of the plate, made at precise increments from center along the direction of motion of the plate, become accurately calibrated locations. Similarly, by utilizing other plates and making measurements similar to the first plate along respective axes, along the direction of motion of the plates, calibration along multiple translational axes is obtained. This method adapts easily to using translational stages that are part of the equipment into which the sensors are built. A flat plate is mounted on the stage and the sensor calibrated with no other auxiliary equipment required. Alternately, the sensor can be translated instead of the plates to effect the same calibration.

When very high accuracy is needed (i.e., $+/-0.0001''$) plates are required to be flat to $+/-0.00001''$ to utilize standard calibration method (introducing no more than 10% of the allowable error). Plates with such flatness exhibit mirror-like reflective characteristics which would cause the reflected light intensity to vary over a very large dynamic range. It is very difficult to design a sensor to accommodate such large intensity variations, so it is preferable to avoid mirror-like surfaces. By making the flat plate surface diffuse, sensor positions can be averaged to yield results not showing any degradation due to the surface finish.

The present invention will hereafter be described with reference to an examplary embodiment, as illustrated in the drawings. However, it is to be undertood that this embodiment is illustrated for the purpose of information only, and that nothing therein is to be considered limiting of any aspect of the invention.

DESCRIPTION OF PREFERRED EMBODIMENTS

It possible to obtain a plate flat to ten times greater than the required accuracy of the calibration for less cost than more complicated structures. It is also possible to build precision translation tables or to instrument a table to accurately report its position. It is further possible to use available motion within the equipment that uses the measurement sensors. The translation may be applied to the plate or the sensor since it is only the relative change in location that will provide the calibration.

Figure 1:
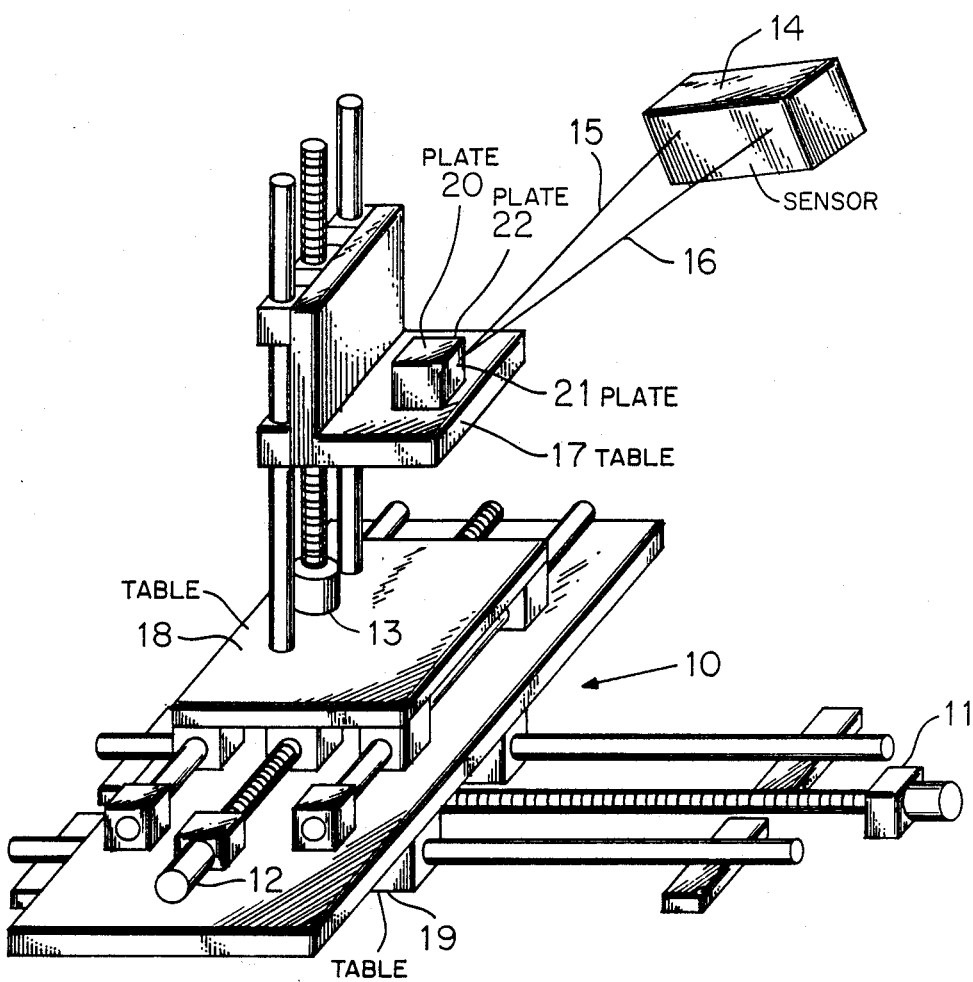
FIG. 1 is an isometric view and illustrates a preferred embodiment of the invention with 3 flat plates (a cube) perpendicular to the three directions of translation and a sensor at a preferred angle measuring distances to the plates.
Figure 2:
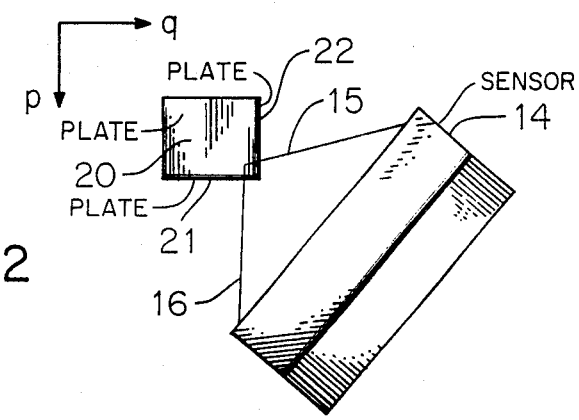
FIG. 2 shows a top view of the sensor, plates, and translation table directions at the preferred orientation.
Figure 3:
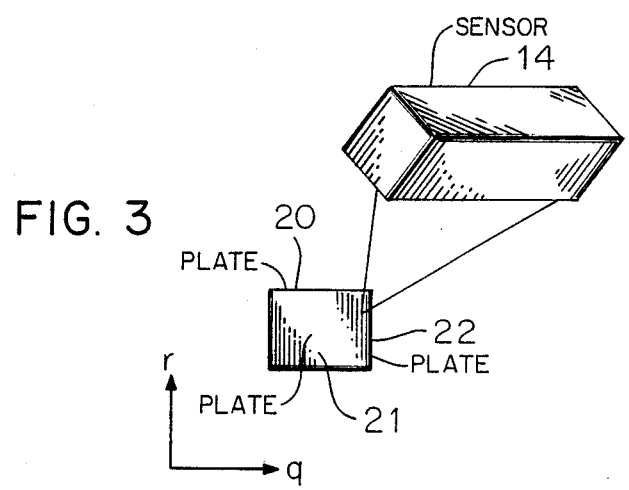
FIG. 3 shows a front view of the sensor, plates, and translation table directions at the preferred orientation.
Figure 4:
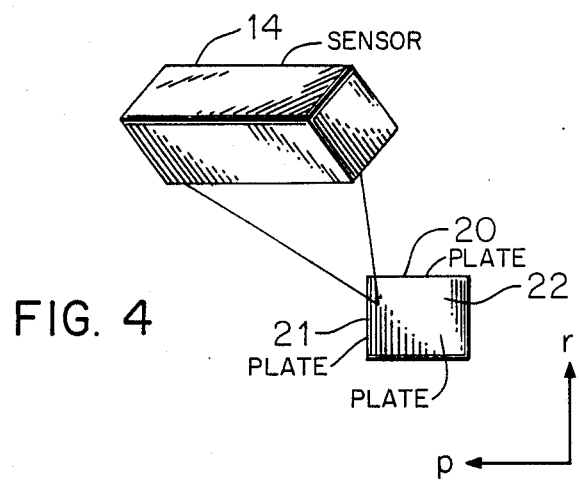
FIg. 4 shows a side view of the sensor, plates, and translation table directions at the preferred orientation.

To calibrate the optical measurement sensor, a flat plate is mounted on a translation assembly perpendicular to the translation direction. FIG. 1 illustrates the mounting of three very flat plates 20, 21 and 22 on translation assembly 10 perpendicular to the directions of translation. Drive mechanisms 11, 12 and 13 are used to move tables 19, 18 and 17 toward and away from sensor 14. Precision squares and indicators can be used to verify that plates 20, 21 and 22 are perpendicular to the directions of travel or to measure the deviation from the perpendicular. FIGS. 2, 3 and 4 provide orthographic views along the principal axes of the sensor 14 and calibration cube with surfaces 20, 21, 22.

To calibrate one direction, for example, r, optical sensor 14 is placed with its measurement axis not perpendicular to the direction of the translation r. Sensor 14 emits rays of light 15 that illuminate a small area of plate 20. A light sensor such as a TV camera in sensor 14 receives rays of light 16 from the illuminated area and transmits a unique signal to a signal processor for interpretation. Relying on the ability of sensor 14 to always send the same unique signal whenever a surface reflects projected light 15 from the same location relative to sensor 14, the sensor system can reliably measure this point. The position of table 17 in table assembly 10 becomes the measured r value for each point measured at that table position. A calibration system merely must identify and store the measurement value of each measurable point. The sensor will then report the correct value when measuring an unknown surface by using the stored values. The method is one of substitution of the unknown surface at the same location as the known calibration surface. At completion, the sensor is calibrated in the r direction.

The above method can be extended to the other two axes, p and q, utilizing three flat plates 20, 21 and 22 mounted orthogonally to one another. The optical sensor 14 is mounted with its measurement axis not perpendicular to any of the three translation directions. Optimally, sensor 14 is mounted in a fixed position with its measurements axis at 45 degrees off perpendicular from all three translation directions. By repeating the above method for each axis p, q and r, the sensor will be calibrated, providing an accurate calibration in an orthogonal 3-D calibration space.

It should be noted that the above method may be used to calibrate a measurement sensor utilizing an arbitrary number of axes in arbitrary directions. In some applications, it may be desirable to obtain a calibration along axes that do not lie along the traditional orthogonal axes set.

When it is not possible to utilize plates that are flat to ten times greater than the required accuracy, modification of the plates is needed to obtain the required calibration. As noted above, this occurs when the required flatness would produce a mirror-like surface. A suitable solution requires the flat plate to be modified with randomn unbiased surface undulations on the order of a few wavelengths of light by using a chemical etch. A plane (or line) fit can be carried out on measured data for small localized areas (centered on the desired point of interest). The actual values for the point of interest are then computed from the fit. Using a least squares (or other averaging method), the measured data is averaged and a high accuracy is achieved. A large amount of data is required to ensure an accurate calibration. This can be extended to obtaining data from several locations on the plate and averaging to minimize error from local plate surface deviations as long as those deviations aren't correlated.

Figure 5:
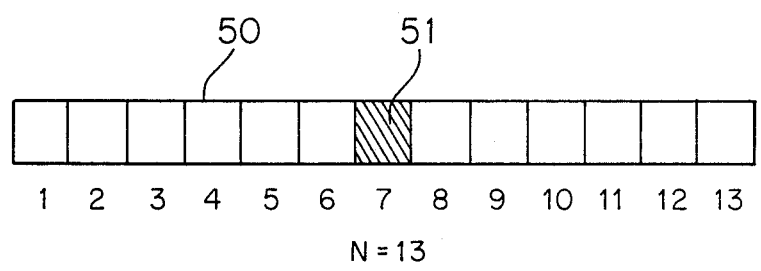
FIG. 5 illustrates an averaging window.

As before, each axis is calibrated individually. For the 'r' axis, plate 20 is positioned at the rear of the view volume. Sensor 14 measures this position, and the sensor value and plate 20 position are recorded. Plate 20 is incremented forward a small amount for the next measurement. This is repeated many times throughout the entire view volume (e.g. 500 times). A table is then created relating Sensor 14 measured values to plate 20 measured depths. An averaging window 50 (FIG. 5), is then moved across these values stopping centered at each point 51 desired for the reference table. In this example, the window represents 13 contiguous samples on a TV line of the sensor data. The samples should be evenly spaced, though not necessarily contiguous. A least squares fit is done on all points inside this window. The center value obtained from the fit is saved as that position's measured value. This is repeated for the entire table. The whole process is repeated for the p and q axes. At completion, the sensor is calibrated in the p, q, and r directions. By utilizing a least squares or other averaging method, the error resulting from the measured surface deviations can be reduced by $\sqrt{N}$ where N is the number of points in the window.

ERROR ANALYSIS

The accuracy of this calibration method depends on many parameters which must be controlled or measured. The reference table may then be corrected for these errors to the level of accuracy obtainable by the measuring equipment.

PLATE FLATNESS

Setting the plates perpendicular to the direction of translation simplifies calibration by assuring every point measured by sensor 14 is at that specific location of the translating axis. Any deviation from absolute flatness contributes directly to error in that location (i.e. 0.0001" error in flatness of plate 20 produces 0.0001" error in r). Similarly, errors in flatness on plates 21 and 22 contribute to errors in p and q.

PLATE PERPENDICULAR TO TRANSLATION DIRECTION

All measurements are assumed to be made on a plate perpendicular to the direction of travel which is parallel to the direction of the coordinate axis to be calibrated. For each location of the plate, each point measured on the plate will have the same coordinate value, since the plate is perpendicular to the coordinate axis. The face of plate 20 is by definition perpendicular to the r direction. Likewise, plate 22 is perpendicular to the q direction, and plate 21 is perpendicular to the p direction. Any angular deviation introduces an error.

Figure 6:
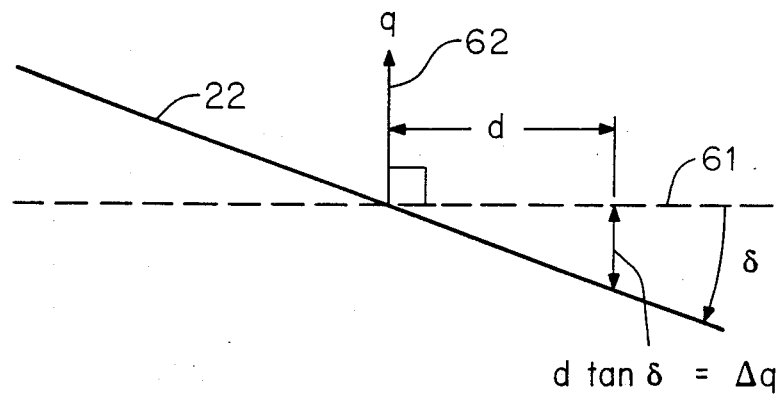
FIG. 6 illustrates the error when a plate is not perpendicular to the travel direction.

If plate 22 is at a fixed angle to the direction of travel, then as shown in FIG. 6:

error $\Delta q = d \tan \delta$ where $\delta$ is the angular amount that the plate 22 surface deviates from perpendicular 61 to the direction of motion q 62, and d is the distance perpendicular to the direction of motion measured from the field center. Note that the q axis is to be calibrated along the direction of translation q, not perpendicular to plate 22. Similar errors for p and r result from angular deviations of plates 21 and 20. The same error is introduced if the plate wobbles as the axis is translated.

It should be noted that the error angle $\delta$ does not have to be small. The plates can be purposely placed at known angle to the direction of motion, and the calibration could be corrected as described above to yield a valid calibration. However, it can be appreciated that the plates placed orthogonal to the directions of motion is preferred.

TRANSLATION ACCURACY

Any error in measuring the amount of translation directly affects the calibration accuracy (i.e. 0.0001" error in measurement produces 0.0001" calibration error).

MULTIPLE SENSOR CALIBRATION

Figure 7:
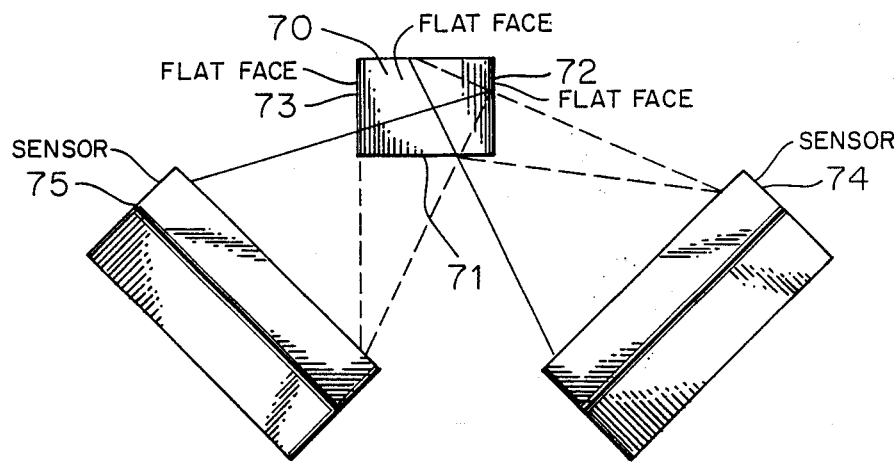
FIG. 7 illustrates two sensors with a common measurement volume and a calibration block.

FIG. 7 illustrates how two sensors may be mounted to view a common volume. The sensors 74, 75 are shown in the plan view looking down at an angle upon a calibration cube with flat faces 70, 71, 72, 73. By accurately transporting the cube through the common volume in three directions orthogonal to the faces 70, 71, 72, 73, sensors 74 and 75 acan be calibrated. Since common translation directions force common coordinate directions, angular alignment (registration) of the sensor measurement systems are assured. Common faces 70 and 71 assure that the coordinate values orthogonal to those faces agree (register). By measuring the distance between faces 72 and 73, with a micrometer for example, the coordinate values orthogonal to those faces can be properly offset to complete the calibration and registration procedure. The method can obviously be extend to additional sensors.

What is claimed is:

1. A method for calibrating one dimension of an optical three-dimensional measurement sensor comprising the steps of aligning a flat plate perpendicular to a direction of controlled linear motion, said linear motion having a defined length of travel; aligning a sensor with a measurement center line located at a non-zero angle relative to said linear motion such that the surface of said plate is measurable by said sensor along said defined length of travel; recording measurements obtained from said sensor for specific locations of said plate along said length of travel; determining deviations from orthogonality of said plate from said direction of linear motion; and correcting the recorded measurements accordingly.

2. A method as defined in claim 1, wherein said sensor is moved and said plate remains stationary.

3. A method for calibrating the three dimensions of an optical three-dimensional measurement sensor comprising the steps of: aligning a flat plate perpendicular to a direction of controlled linear motion, said linear motion having a defined length of travel; aligning a sensor with a measurement center line located at a non-zero angle relative to said linear motion such that the surface of said plate in measurable by said sensor along said defined length of travel; recording measurements obtained from said sensor for specific locations of said plate along said length of travel; determinating deviations from orthogonality of said plate from said direction of linear motion; and correcting the recorded measurements accordingly; providing two additional plates, each said plate being orthogonal to a direction of controlled linear motion with defined length of travel; said linear motion directions forming an orthogonal set of axes along which said sensor is calibrated; recording measurements obtained from said sensor for specific locations of said additional plates along respective, lengths of travel of said additional plates; determining deviations from orthogonality of said additional plates from directions of said respective lengths of travel; and correcting said recorded measurements accordingly.

4. A method for calibrating more than one direction of measurement made by an optical three-dimensional measurement sensor comprising the steps of: aligning a flat plate perpendicular to a direction of controlled linear motion, said linear motion having a defined length of travel; aligning a sensor with a measurement center line located at a non-zero angle relative to said linear motion such that the surface of said plate is measurable by said sensor along said defined length of travel; recording measurements obtained from said sensor for specific locations of said plate along said length of travel; determining deviations from orthogonality of said plate from said direction of linear motion; and correcting the recorded measurements accordingly and carrying out said steps for each direction to be calibrated.

5. A method for calibrating three orthogonal axes of an optical three-dimensional measurement sensor comprising the steps of: aligning a flat plate perpendicular to a direction of controlled linear motion, said linear motion having a defined length of travel; aligning a sensor with a measurement center line located at a non-zero angle relative to said linear motion such that the surface of said plate is measurable by said sensor along said defined length of travel; recording measurements obtained from said sensor for specific locations of said plate along said length of travel; determining deviations from orthogonality of said plate from said direction of linear motion; and correcting the recorded measurements accordingly and carrying out said steps for each direction to be calibrated.

6. A method for improving the accuracy of calibration of an optical three-dimensional measurement sensor by calibrating the measurements indicated by a sensor according to the steps of: aligning a flat plate perpendicular to a direction of controlled linear motion, said linear motion having a defined length of travel; aligning a sensor with a measurement center line located at a non-zero angle relative to said linear motion such that the surface of said plate is measurable by said sensor along said defined length of travel; recording measurements obtained from said sensor for specific locations of said plate along said length of travel; determining deviations from orthogonality of said plate from said direction of linear motion; and correcting the recorded measurements accordingly; repeating said calibrating steps at least a second time; and averaging the calibration values recorded at each location to provide an improved value for each location.

7. A method as defined in claim 6, wherein a different portion of said plate is used for each repeat calibration step.

8. A method for improving the accuracy of calibration of and optical three-dimensional measurement sensor by calibrating a dimension of a sensor according to the steps of: aligning a flat plate perpendicular to a direction of controlled linear motion, said linear motion having a defined length of travel; aligning a sensor with a measurement center line located at a non-zero angle relative to said linear motion such that the surface of said plate is measurable by said sensor along said defined length of travel; recording measurement obtained from said sensor for specific locations of said plate along said length of travel; determining deviations from orthogonality of said plate from said direction of linear motion; and correcting the recorded measurements accordingly and applying moving window averaging on calibration values recorded at each location to provide an improved value for each location.

9. Apparatus for calibrating three-dimensional measurement sensors comprisng: a sensor with an axis; at least one plate with surface flatness corresponding to a predetermined accuracy means for moving said plate through a sensor measurement volume; said plate being orthogonal to the direction of motion and skew to said axis of said sensor; means for recording the measurements made by said sensor; and means for recording the locations at which said measurements are made.

10. Apparatus as defined in claim 9, comprising at least two plates, each plate being transported in a different direction.

11. Apparatus as defined in claim 9, comprising three plates transported along mutually orthogonal axes.

12. Apparatus as defined in claim 9, wherein said sensor is moved and said plate remains stationary.

* * * * *